(12) United States Patent
Wang et al.

(10) Patent No.: US 12,522,171 B2
(45) Date of Patent: Jan. 13, 2026

(54) RETRACTOR PRETENSIONER ASSEMBLY

(71) Applicant: AUTOLIV ASP, INC., Ogden, UT (US)

(72) Inventors: Bin Wang, Lake Orion, MI (US); Christopher D. Hall, Algonac, MI (US); Jon E. Burrow, Ortonville, MI (US); Kenneth Kohlndorfer, Roseville, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 210 days.

(21) Appl. No.: 18/333,896

(22) Filed: Jun. 13, 2023

(65) Prior Publication Data

US 2024/0416863 A1  Dec. 19, 2024

(51) Int. Cl.
B60R 22/46 (2006.01)

(52) U.S. Cl.
CPC .............................. B60R 22/4633 (2013.01)

(58) Field of Classification Search
CPC . B60R 22/46; B60R 22/4628; B60R 22/4633; B60R 22/4638; B60R 22/4642
See application file for complete search history.

(56) References Cited

U.S. PATENT DOCUMENTS

| | | |
|---|---|---|
| 8,042,835 B2 | 10/2011 | Bieg et al. |
| 9,529,359 B1 | 12/2016 | Annan et al. |
| 9,555,767 B2 | 1/2017 | Gentner |
| 9,744,940 B1 | 8/2017 | Hall |
| 9,796,356 B2 | 10/2017 | Hertag et al. |
| 9,908,505 B2 | 3/2018 | Gentner |
| 10,017,150 B2 | 7/2018 | Asako |
| 10,025,303 B1 | 7/2018 | Annan |
| 10,029,647 B2 | 7/2018 | Gentner |
| 10,059,302 B2 | 8/2018 | Landbeck et al. |
| 10,308,214 B2 | 6/2019 | Asako |
| 10,315,617 B2 | 6/2019 | Franz et al. |

(Continued)

FOREIGN PATENT DOCUMENTS

| | | |
|---|---|---|
| CN | 104334420 A | 2/2015 |
| CN | 104890616 A | 9/2015 |

(Continued)

*Primary Examiner* — Anna M Momper
*Assistant Examiner* — Ermia E. Melika
(74) *Attorney, Agent, or Firm* — DICKINSON WRIGHT PLLC

(57) ABSTRACT

A seatbelt pretensioner system includes a pretensioner tube in fluid communication with a gas generator and a pretensioner rod having a proximal end portion disposed toward the gas generator and a distal end portion disposed at an exit of the pretensioner tube. The pretensioner rod is disposed inside the pretensioner tube in a pre-actuation state and adapted to travel within the pretensioner tube toward a pretensioner wheel upon an actuation of the gas generator in a post-actuation state. The pretensioner rod includes a protrusion formed in a radial direction of the rod to couple with the pretensioner tube to restrict the rod from moving out from the pretensioner tube in the pre-actuation state. The pretensioner rod is configured to avoid the stripping of the rod and reduce energy consumption when the polymer rod is deformed during pretensioning.

13 Claims, 12 Drawing Sheets

(56) References Cited

U.S. PATENT DOCUMENTS

| | | | |
|---|---|---|---|
| 10,328,895 | B2 | 6/2019 | Kohlndorfer |
| 10,369,963 | B2 | 8/2019 | Kohlndorfer |
| 10,525,932 | B2 | 1/2020 | Yoshioka |
| 10,549,715 | B2 | 2/2020 | Yoshioka |
| 11,059,452 | B2 | 7/2021 | Hall |
| 2014/0014758 | A1 | 1/2014 | Gentner et al. |
| 2015/0224960 | A1 | 8/2015 | Hertag et al. |
| 2015/0298926 | A1 | 10/2015 | Okubo et al. |
| 2016/0114762 | A1 | 4/2016 | Landbeck et al. |
| 2017/0313279 | A1* | 11/2017 | Trübner ............ B60R 22/4671 |
| 2018/0043859 | A1 | 2/2018 | Yoshioka et al. |
| 2018/0065595 | A1 | 3/2018 | Yoshioka |
| 2018/0154861 | A1 | 6/2018 | Motoki |
| 2018/0178752 | A1 | 6/2018 | Hirokazu |
| 2018/0265034 | A1* | 9/2018 | Kohlndorfer ....... B60R 22/4628 |
| 2018/0297552 | A1 | 10/2018 | Yanagawa |
| 2019/0047510 | A1 | 2/2019 | Wataru |
| 2019/0054894 | A1 | 2/2019 | Daeuber |
| 2019/0210557 | A1 | 7/2019 | Modinger et al. |
| 2019/0210558 | A1 | 7/2019 | Hall |
| 2019/0232916 | A1* | 8/2019 | Wang ................ B60R 22/4628 |
| 2019/0299923 | A1 | 10/2019 | Yanagawa et al. |
| 2019/0308585 | A1 | 10/2019 | Yanagawa et al. |
| 2020/0086826 | A1 | 3/2020 | Yanagawa et al. |
| 2020/0231115 | A1 | 7/2020 | Kabushiki et al. |
| 2020/0238949 | A1 | 7/2020 | Sakano |
| 2020/0282948 | A1 | 9/2020 | Kabushiki et al. |
| 2020/0290560 | A1 | 9/2020 | Yong |
| 2020/0298793 | A1 | 9/2020 | Kiyoshi et al. |
| 2020/0324732 | A1 | 10/2020 | Kabushiki et al. |
| 2020/0324733 | A1* | 10/2020 | Yanagawa .......... B60R 22/4633 |
| 2020/0353892 | A1* | 11/2020 | Wang ................ B60R 22/4628 |
| 2020/0384946 | A1 | 12/2020 | Kabushiki et al. |
| 2021/0206341 | A1 | 7/2021 | Modinger et al. |
| 2021/0354656 | A1* | 11/2021 | Wang ................ B60R 22/1955 |
| 2023/0331186 | A1* | 10/2023 | Uchibori ................ B60R 22/46 |
| 2023/0356689 | A1* | 11/2023 | Uchibori ............ B60R 22/4628 |

FOREIGN PATENT DOCUMENTS

| | | |
|---|---|---|
| CN | 107257754 A | 10/2017 |
| CN | 107685709 A | 2/2018 |
| CN | 109311448 A | 2/2019 |
| DE | 102006031359 A1 | 10/2007 |
| DE | 102006031360 A1 | 10/2007 |
| DE | 102010051463 A1 | 5/2012 |
| DE | 102010054845 A1 | 3/2013 |
| DE | 102013218691 A1 | 11/2013 |
| DE | 102014200995 A1 | 5/2014 |
| DE | 102014203853 A1 | 6/2014 |
| DE | 102014006500 A1 | 11/2015 |
| DE | 102014224490 B3 | 12/2015 |
| DE | 112011103805 B4 | 3/2017 |
| DE | 102016118461 A1 | 3/2018 |
| DE | 102016118467 A1 | 3/2018 |
| DE | 112017002887 T5 | 3/2019 |
| DE | 102010054846 A1 | 7/2019 |
| EP | 3254907 A1 | 12/2017 |
| EP | 3254908 A1 | 12/2017 |
| EP | 3254910 A1 | 12/2017 |
| EP | 3514022 A1 | 7/2019 |
| JP | 2014088107 A | 5/2014 |
| JP | 2014088108 A | 5/2014 |
| JP | 2014201154 A | 10/2014 |
| JP | 2014201155 A | 10/2014 |
| JP | 2014201156 A | 10/2014 |
| JP | 2015054651 A | 3/2015 |
| JP | 2015217729 A | 12/2015 |
| JP | 2016078578 A | 5/2016 |
| JP | 2016088439 A | 5/2016 |
| JP | 2016104608 A | 6/2016 |
| JP | 2016107915 A | 6/2016 |
| JP | 2016112935 A | 6/2016 |
| JP | 2016112981 A | 6/2016 |
| JP | 5975845 B2 | 8/2016 |
| JP | 5975846 B2 | 8/2016 |
| JP | 6045425 B2 | 12/2016 |
| JP | 2016203844 A | 12/2016 |
| JP | 2016203845 A | 12/2016 |
| JP | 2016215749 A | 12/2016 |
| JP | 6063329 B2 | 1/2017 |
| JP | 2017013630 A | 1/2017 |
| JP | 2017061208 A | 3/2017 |
| JP | 2017077843 A | 4/2017 |
| JP | 2017100683 A | 6/2017 |
| JP | 2017100684 A | 6/2017 |
| JP | 2017154525 A | 9/2017 |
| JP | 2017218084 A | 12/2017 |
| JP | 2017218085 A | 12/2017 |
| JP | 2017218091 A | 12/2017 |
| JP | 2017218092 A | 12/2017 |
| JP | 2017218093 A | 12/2017 |
| JP | 2018095144 A | 6/2018 |
| JP | 2018095177 A | 6/2018 |
| JP | 2019026217 A | 2/2019 |
| JP | 6498507 B2 | 4/2019 |
| JP | 6509100 B2 | 5/2019 |
| JP | 2019089375 A | 6/2019 |
| WO | 2015037485 A1 | 3/2015 |
| WO | 2017213188 A1 | 12/2017 |
| WO | 2019020388 A1 | 1/2019 |
| WO | 2019026559 A1 | 2/2019 |
| WO | 2019063469 A1 | 4/2019 |

* cited by examiner

PRE-TENSIONING

RETRACTOR PRETENSIONER ASSEMBLY

TECHNICAL FIELD

The present disclosure relates to seatbelt restraint devices for restraining an occupant of a vehicle, and more particularly relates to devices for pretensioning a seatbelt.

BACKGROUND

The statements in this section merely provide background information related to the present disclosure and may not constitute prior art.

Seatbelt restraint systems for restraining an occupant in a vehicle seat play an important role in reducing occupant injury in vehicle crash situations. Seatbelt restraint systems of the conventional so-called "3-point" variety commonly have a lap belt section extending across the seat occupant's pelvis and a shoulder belt section crossing the upper torso, which are fastened together or are formed by a continuous length of seatbelt webbing. The lap and shoulder belt sections are connected to the vehicle structure by anchorages.

A belt retractor is typically provided to store belt webbing and may further act to manage belt tension loads in a crash situation. Seatbelt restraint systems which are manually deployed by the occupant (so-called "active" types) also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision or rollover event.

OEM vehicle manufacturers often provide seatbelt restraint systems with pretensioning devices, which tension the seatbelt either during an impact of the vehicle or even prior to impact (also known as a "pre-pretensioner") to enhance occupant restraint performance. The pretensioner takes out slack in the webbing and permits the belt restraint system to couple with the occupant early in the crash sequence. One type of pretensioner acts on the webbing retractor to tension the belt.

Various designs of retractor pretensioners presently exist, including a type known as a roto-pretensioner that incorporates a gas generator using a pyrotechnic charge for generating actuation gas. Generally, ignition of the pyrotechnic charge or other combustible material creates gas pressure in a chamber having a piston to impart motion upon a driving element such as a piston or a rod element disposed in a pretensioner tube, which engage with and wind a retractor spool pretensioner wheel to retract the webbing.

One of the driving elements such as the pretensioner rod is formed of a polymer material. In general, the polymer material has higher linear coefficient of thermal expansion such that the polymer rod disposed inside the pretensioner tube formed of a metallic material has much greater dimension changes than the metallic tube when service environment temperature goes up and down, such as from daytime high to night low, or between summer and winter. In this case (i.e., during repeated temperature cycles), the polymer rod could move or "creep" in the direction of lower friction resistance such that the polymer rod could move out of the pretensioner tube before pretensioning and could interfere with one of the components in the pretensioner system such as a spool drive pinion. This phenomenon can cause interference with the free movement of the webbing spool during normal operation of the retractor.

A further issue with polymer rod type pretensioners is that, in some operation conditions, the polymer rod may not properly engage with the pretensioner wheel (drive pinion) during pretensioning operation such that insufficient pretensioning force is transferred to pretension the seatbelt pretensioning retractor assembly. Because the pretensioner wheel is made with a material that has higher hardness than the polymer material of the rod, a stripping or cutting of the rod can occur during pretensioning, reducing the effective transfer of energy to the retractor spool.

SUMMARY

The present disclosure relates to a seatbelt pretensioning retractor assembly including a spindle and a frame for use in a vehicle. In particular, the present disclosure relates a seatbelt pretensioner system for the seatbelt pretensioning retractor assembly, which includes a pretensioner rod, a housing, a guide plate and a pretensioner tube. In the present disclosure, the pretensioner rod is in the form of a flexible elongated rod formed of a polymer material. Further, the pretensioner rod is designed to avoid the design and performance limitations mentioned previously; namely, rod stripping or cutting during pretensioning, and also to include anti-creeping features to avoid the rod's interference with the pretensioner wheel caused by a thermal cycle environment or aging in the pre-actuation state of the rod.

According to an aspect of the present disclosure, the seatbelt pretensioner system for use in a seatbelt pretensioning retractor assembly includes a pretensioner tube in fluid communication with a gas generator, and a pretensioner rod having a proximal end portion disposed towards the gas generator and a distal end portion disposed at an exit of the pretensioner tube. The pretensioner rod is disposed inside the pretensioner tube in a pre-actuation state and is adapted to travel within the pretensioner tube toward a pretensioner wheel upon an actuation of the gas generator in a post-actuation state. Further, the pretensioner rod includes a protrusion formed in a radial direction of the rod to couple with the pretensioner tube to restrict the rod from moving out from the pretensioner tube in the pre-actuation state.

According to a further aspect of the present disclosure, the pretensioner tube includes a tube detent formed radially inward in the exit area of the tube to engage with a protrusion formed in a distal end portion of the pretensioner rod. In the pre-actuation state, the interaction between the protrusion and the tube detent limits the pretensioner rod's movement toward the pretensioner wheel when a thermal creeping of the rod occurs.

According to a further aspect of the present disclosure, the protrusion of the pretensioner rod is designed to be sheared or smeared off by pretensioning force and rod movement generated by the gas generator such that in the post-actuation state, the pretensioner rod moves freely out from the pretensioner tube. Due to the tube detent located in the exit area of the pretensioner tube, the protrusion of the pretensioner rod is coupled to the tube detent such that a distal-most end of the rod is substantially aligned with a second tube end of the pretensioner tube in the pre-actuation state.

According to a further aspect of the present disclosure, the protrusion of the pretensioner rod protrudes radially from a recessed portion of the pretensioner rod. Further, the pretensioner rod is in the form of a flexible elongated rod formed of a polymer material.

According to another aspect of the present disclosure, a seatbelt pretensioner system for use in a seatbelt pretensioning retractor assembly having a housing and a spindle includes a pretensioner tube in fluid communication with a gas generator, a pretensioner rod having a proximal end portion disposed towards the gas generator, a distal end portion disposed at an exit of the pretensioner tube inside the pretensioner tube, and a chamfer formed in a distal end portion of the pretensioner rod, and a pretensioner wheel rotatably mounted to the housing and fixedly coupled to the spindle. The pretensioner wheel includes a body portion having an annular shape, and a plurality of vanes having a first sidewall and a second sidewall, which are formed around a circumference of the body portion. Further, in a cross-sectional plane of the pretensioner wheel perpendicular to a rotational axis of the pretensioner wheel, the pretensioner wheel has a root circle defined by connecting each of root sections of the vanes and a tip circle defined by connecting each of tip points of the vanes. A first point is defined on a surface of the first sidewall when a circle line defined between the tip circle and the root circle intersects with the first sidewall and a second point is defined on a surface of the second sidewall when the circle line intersects with the second sidewall such that a vane distance is defined between the first point and the second point in a pocket formed between two adjacent vanes. The chamfer of the rod has a chamfer length, which is greater than the vane distance in the pretensioner wheel.

According to a further aspect of the present disclosure, in a cross-sectional side view of the rod along the longitudinal axis, the chamfer is tapered, and has a starting point above a center line of the rod along the longitudinal axis on a distal-most end of the rod and an ending point on a circumferential edge of the rod such that the chamfer length is defined as a distance from the starting point to the ending point.

According to a further aspect of the present disclosure, the chamfer of the rod is formed with a flat shape or a curved shape. Further, the circle line is defined as a middle circle located between the tip circle and the root circle.

According to a further aspect of the present disclosure, the pretensioner rod is configured to avoid a stripping of the rod and reduce energy consumption when the rod is engaged with the vanes during pretensioning.

According to a further aspect of the present disclosure, a first radial thickness defined in a non-recessed section of the rod is greater than a second radial thickness defined in a recessed section of the rod in a cross-sectional side view of the rod along the longitudinal axis. Further, a length of the non-recessed section along the longitudinal axis of the rod is greater than a tip distance between two adjacent vane tips of the pretensioner wheel. A deformed depth of the pretensioner rod is between 15% and 50% of a radial thickness of the rod when the pretensioner rod is engaged with the vanes of the pretensioner wheel during pretensioning.

Further details and benefits will become apparent from the following detailed description of the appended drawings. The drawings are provided herewith purely for illustrative purposes and are not intended to limit the scope of the present disclosure.

BRIEF DESCRIPTION OF THE DRAWINGS

The drawings described herein are for illustration purposes only and are not intended to limit the scope of the present disclosure in any way.

It should be understood that throughout the drawings, corresponding reference numerals indicate like or corresponding parts and features.

DETAILED DESCRIPTION

Figure 1:
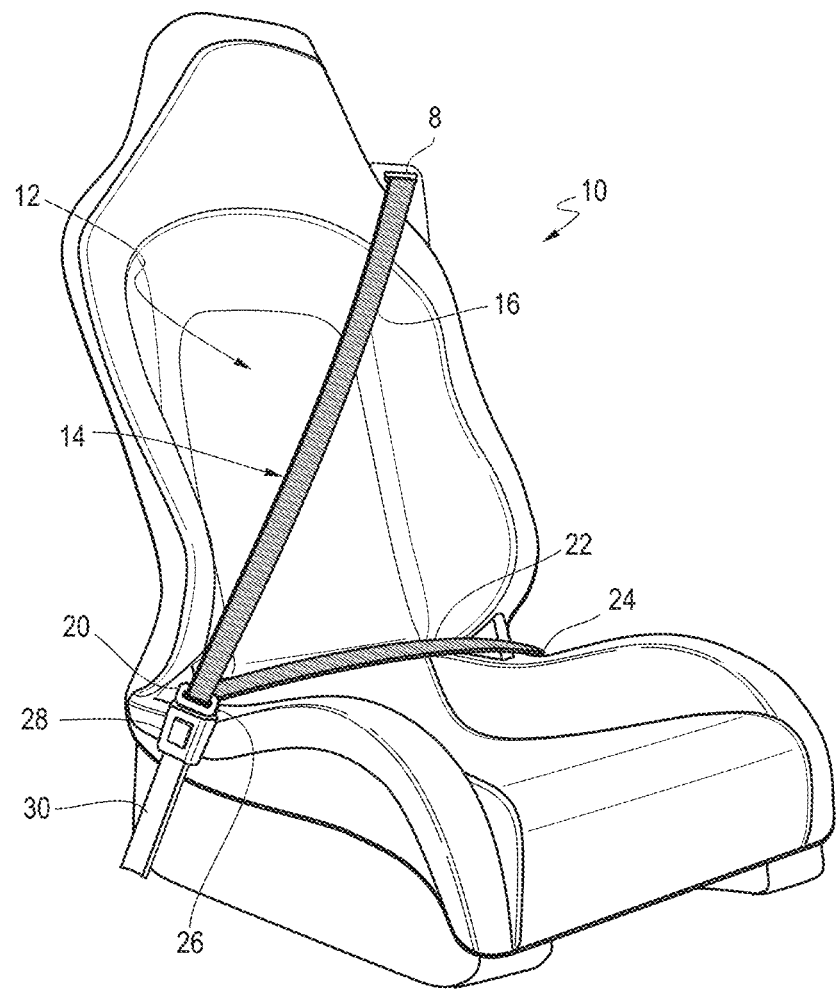
FIG. 1 shows a perspective view of an occupant restraint system.

The following description is merely exemplary in nature and is in no way intended to limit the present disclosure or its application or uses. It should be understood that throughout the drawings, corresponding reference numerals indicate like or corresponding parts and features.

FIG. 1 illustrates a vehicle seat 10 and a seatbelt assembly 12 for a vehicle according to an exemplary form of the present disclosure. The seatbelt assembly 12 includes a seatbelt webbing 14 having a shoulder belt portion 16 extending from an upper guide loop or anchorage 18 to a latch plate 20 and a lap belt portion 22 extending from the latch plate 20 to a lower anchorage 24. The latch plate 20 can include a loop portion 26 through which the webbing 14 extends. The latch plate 20 can be inserted into a seatbelt buckle 28 to lock and unlock the seatbelt assembly 12. A seatbelt buckle cable or strap 30, either directly or in cooperation with other components, secures the seatbelt buckle 28 to a portion of the vehicle structure. It will be appreciated that other manners of attaching the seatbelt webbing 14 to vehicle could also be used, including variations on the latch plate 20 and the seatbelt buckle 28 and their attachments to the webbing 14 and associated vehicle structure.

The seatbelt webbing 14 is able to pay-out from a retractor assembly 32 (shown in FIGS. 2 and 3), which is located within the vehicle seat 10 (in an integrated structural seat design) or is coupled structurally to the vehicle body, so that the effective length of the seatbelt webbing 14 is adjustable. When the buckle latch plate 20 has been fastened to the seatbelt buckle 28, the seatbelt assembly 12 defines a three-point restraint between the upper anchorage 18, the buckle latch plate 20, and the lower anchorage 24. Any other suitable configurations, such as alternative locations for the retractor assembly 32, the buckle latch plate 20, and the lower anchorage 24, may be used with the present disclosure.

Figure 2:
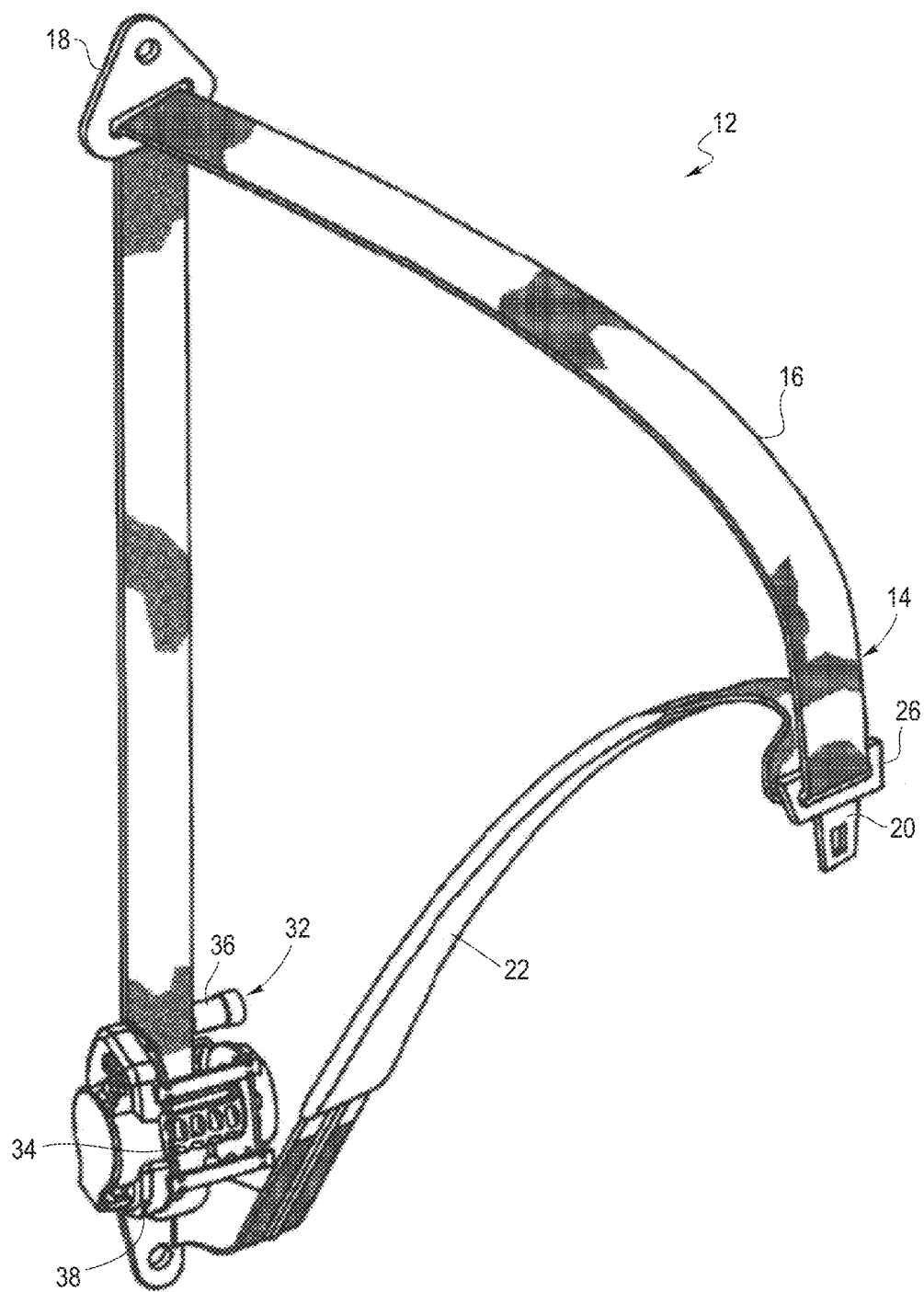
FIG. 2 is a perspective view of the occupant restraint system with various components removed to show a seatbelt retractor assembly including a pretensioner system of FIG. 1.

Referring to FIG. 2, an isometric view of the seatbelt assembly 12 of the described embodiment is illustrated disassociated from the vehicle and showing the retractor assembly 32. The retractor assembly 32 includes a spool assembly 34 and a gas generator 36 mounted to a frame 38. The spool assembly 34 is connected with and stows the webbing 14 of the shoulder belt portion 16, whereas the end of the lap belt portion 22 of the webbing 14 is fixedly engaged with the anchorage point, for example, the frame 38 or another portion of the vehicle such as the seat 10 or floorpan.

Figure 3:
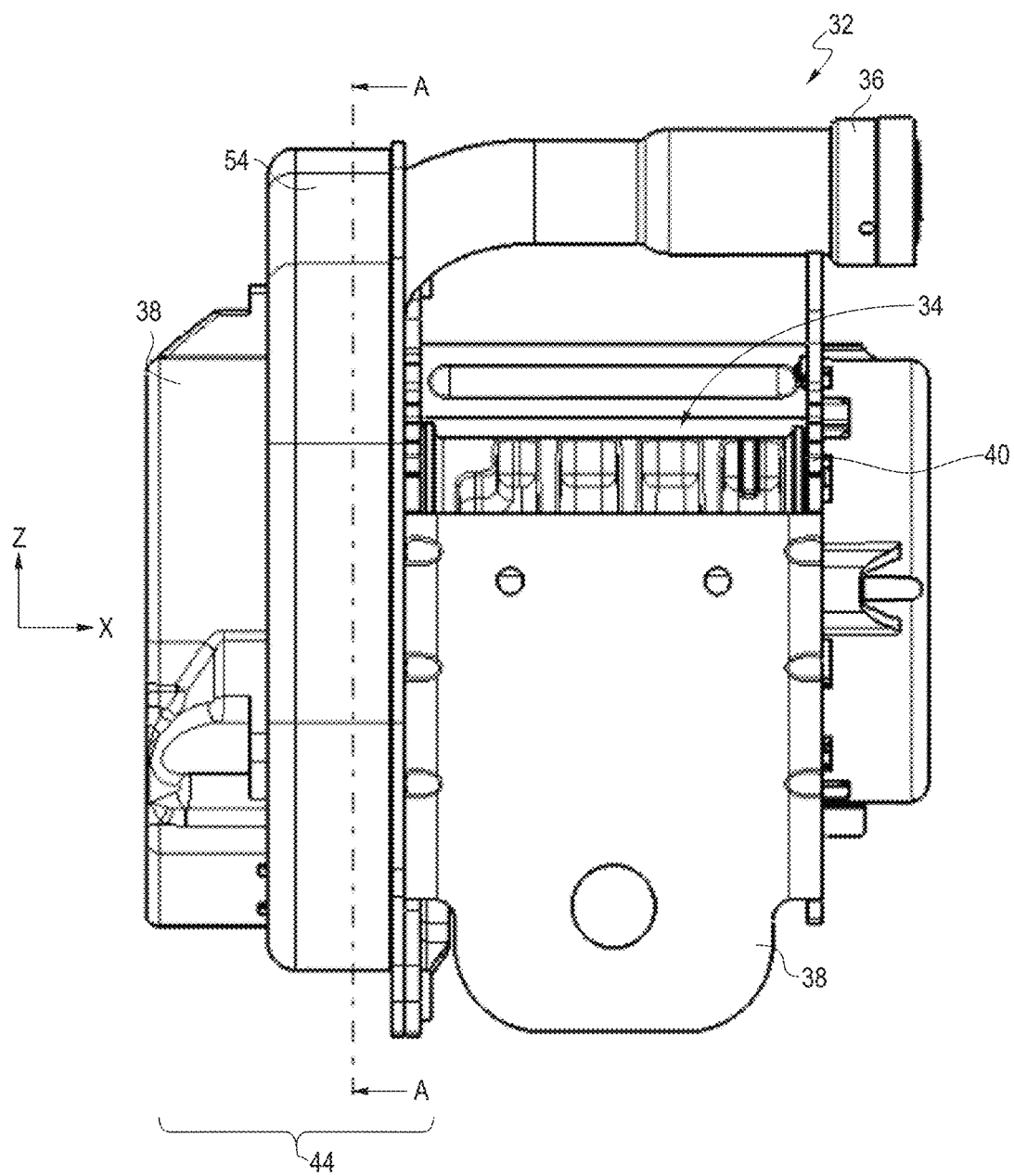
FIG. 3 is a plan view of the seatbelt retractor assembly including the pretensioner system in accordance with an exemplary form of the present disclosure.

Referring to FIG. 3, the spool assembly 34 includes a spindle 40 that engages the shoulder belt portion 16 of the seatbelt webbing 14 and rotates to wind-up or pay-out the seatbelt webbing 14. A torsional "clock" or "motor" type spring is carried within a spring end cap 42 and rotationally biases the spindle 40 to retract the seatbelt webbing 14. The spool assembly 34 may further incorporate other spool control mechanisms that are known in accordance with the prior art, including pretensioners, inertia and webbing sensitive locking devices, torsion bar load limiters, or other belt control devices. "Spool control systems" referred to in this specification may include any system that controls the rotational movement of a webbing spool, thus controlling the extraction and retraction of seatbelt webbing. One such spool control system is a motor-assisted retractor. Spool locking devices typically incorporate a vehicle sensitive locking mechanism having an inertia sensitive element, such as a rolling ball or pendulum, and cause a pretensioner wheel of the spool control system to be engaged to prevent further withdrawing of the seatbelt webbing 14 from the spindle 40. Webbing sensitive locking devices sense rapid pay-out of seatbelt webbing 14 to lock the retractor assembly 32. Various electronic sensing mechanisms that detect the withdrawal of seatbelt webbing 14 and/or the connection of the latch plate 20 to the seatbelt buckle 28 may also be incorporated into the retractor assembly 32.

During normal operation of the vehicle, the retractor assembly 32 allows pay-out of seatbelt webbing 14 to give the occupant a certain amount of freedom of movement. However, if an impact or a potential impact situation is detected, the retractor assembly 32 is locked to prevent pay-out and to secure the occupant in the seat 10. For example, if the vehicle decelerates at a predetermined rate, then the retractor assembly 32 is locked. Due in part to the free pay-out of the seatbelt webbing 14, the seatbelt assembly 12 often develops slack during normal use.

Figure 4:
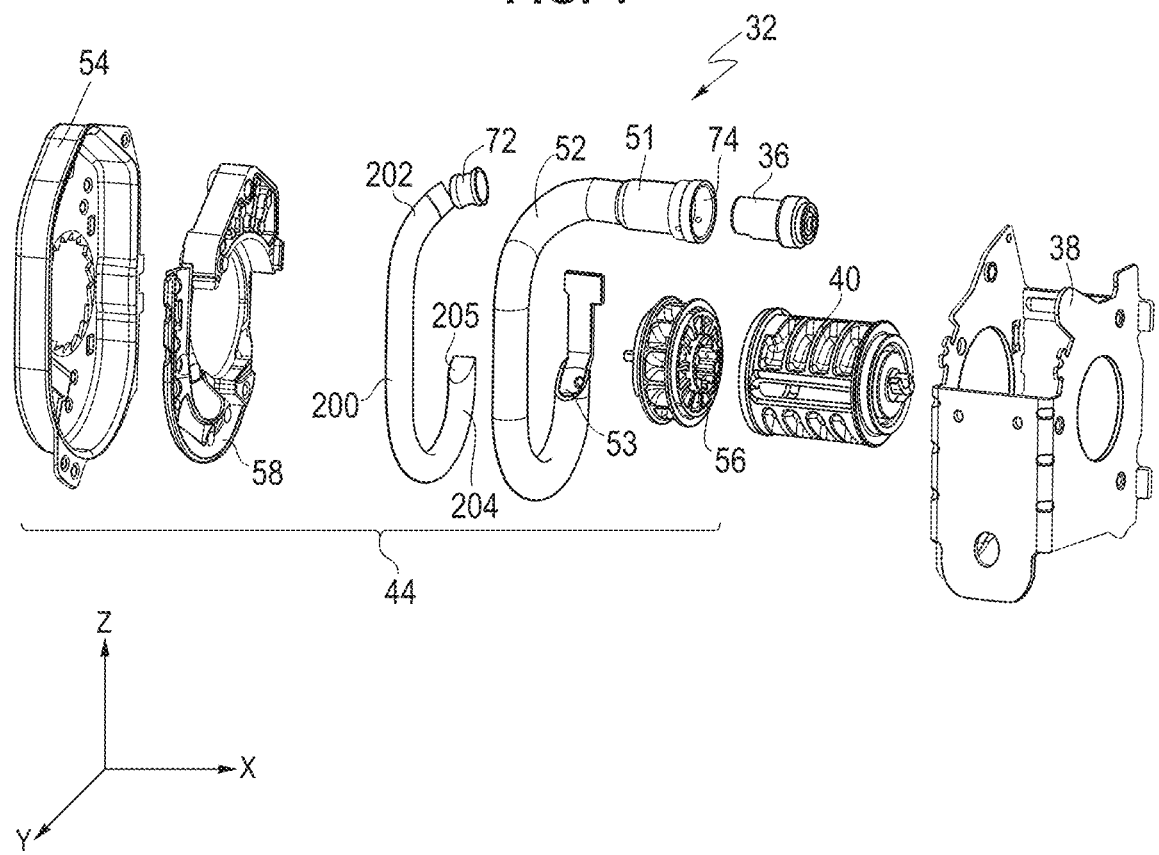
FIG. 4 is an exploded view of the seatbelt retractor assembly including the pretensioner system of FIG. 3.

FIG. 4 shows an exploded view of the retractor assembly 32 including a pretensioner system 44 in accordance with an exemplary form of the present invention. Referring to FIGS. 3-4, the retractor assembly 32 further incorporates the pretensioner system 44 operatively connected to the spool assembly 34 and operable to rotate the spindle 40 for pretensioning. As known to those of skill in the art, a retractor pretensioner winds seatbelt webbing into a more tight condition against the occupant at the initial stages of a detected vehicle impact. This is provided to reduce forward motion or excursion of the occupant in response to the deceleration forces of a vehicle impact or rollover.

As shown in FIGS. 3 and 4, the pretensioner system 44 includes a pretensioner tube 52 in communication with the gas generator 36 at a first tube end 51 of the pretensioner tube 52. The gas generator 36 is used to provide expanding gas in response to a firing signal. As known in the art, for example, the vehicle includes a sensor array sending a signal indicative of an emergency event such as an impact event, crash, or rollover. The vehicle sensor may be a specific impact sensor, or may be a traditional vehicle sensor (e.g., longitudinal or lateral acceleration sensor or otherwise part of a control system having a suite of multiple sensors). Any other impact sensor that is or will be known to those skilled in the art may also be readily employed in conjunction with the seatbelt assembly 12 of the present disclosure. An electronic control unit such as a central processing unit (CPU) or other controller receives a signal and controls the seatbelt assembly 12 to respond by tightening the seatbelt webbing 14 of the vehicle (e.g., via activation of a pretensioner).

In FIG. 4, the pretensioner tube 52 has a pretensioner rod 200, e.g., a polymer rod or a plastically deformable polymer rod disposed therein (also shown in FIG. 5) that has an elongate shape and is flexible within the tube 52. More specifically and as will be discussed in further detail below, the polymer rod 200, when disposed outside of the pretensioner tube 52 prior to insertion therein, has a generally straight shape, and when inserted into the tube 52 it will bend and flex in accordance with the tortuous shape of the tube 52 as shown in the exploded view of FIG. 4.

As shown in FIGS. 3 and 4, the retractor assembly 32 includes the spool assembly 34 mounted to the frame 38. More particularly, the spool assembly 34 will rotate relative to the frame 38 to wind the seatbelt webbing 14 attached to the spool assembly 34. The frame 38 includes a housing 54 having the components of the pretensioner system 44 with a guide plate 58 inside the housing 54. As shown in FIG. 4, the spool assembly 34 includes a pretensioner wheel 56 that is disposed within the housing 54. The pretensioner wheel 56 is attached to the spindle 40. Rotation of the pretensioner wheel 56 will cause the attached spindle 40 to rotate to wind the seatbelt webbing 14 that is attached to the spindle 40.

Figure 4A:
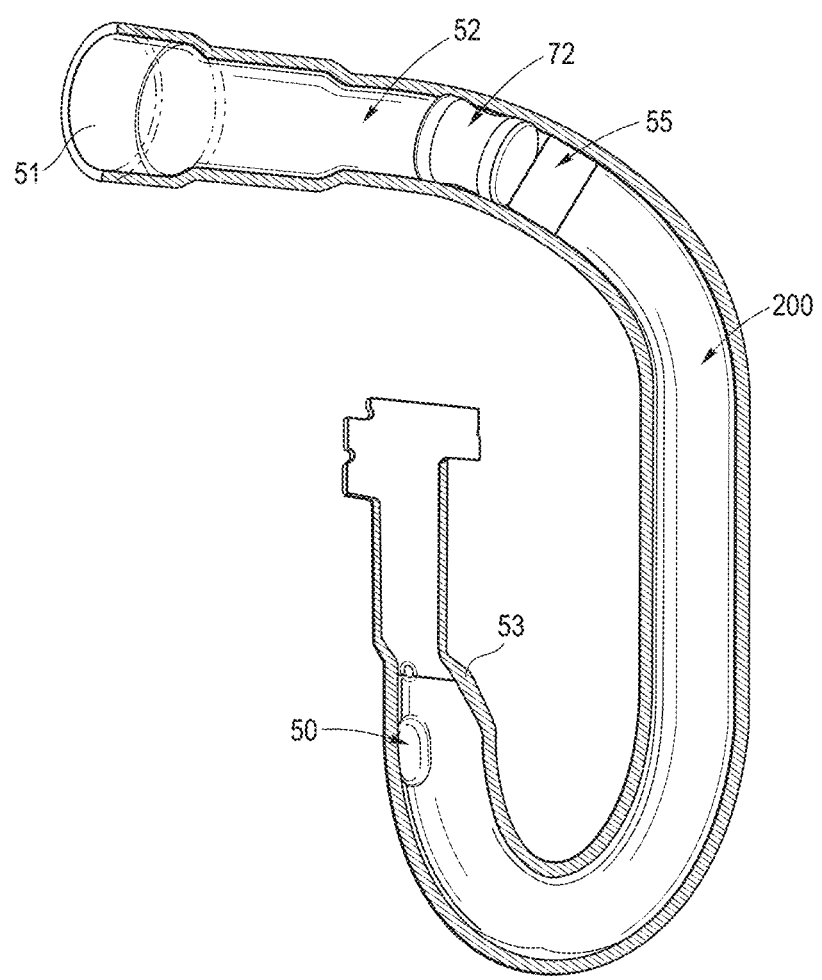
FIG. 4A is a sectional view of the pretensioner tube with a pretensioner rod, a seal and a piston.

Further, FIG. 4A shows a pretensioner tube 52 with a polymer rod 200, which is inserted into the tube 52 with a piston 72 and a stopper 55 attached to the polymer rod 200. The pretensioner rod 200 has a generally circular cross-section in a form of the exemplary embodiment. According to other exemplary embodiments, the rod 200 could have a non-circular cross-section, such as a rectangular cross-section, triangular cross-section, or other polygonal cross-section that allows the rod 200 to be inserted into the tube 52 and adapt to the tortuous shape of the tube 52 when inserted as shown in FIG. 4A. The polygonal cross-section may rotate along the length of the rod 200 to create a spiral shape. In addition, in FIG. 4A, the pretensioner tube includes a tube detent 50 formed near a second tube end 53

(i.e., an exit area of the tube 52) to couple with the polymer rod 200, which is initially inserted into the tube 52.

Figure 5:
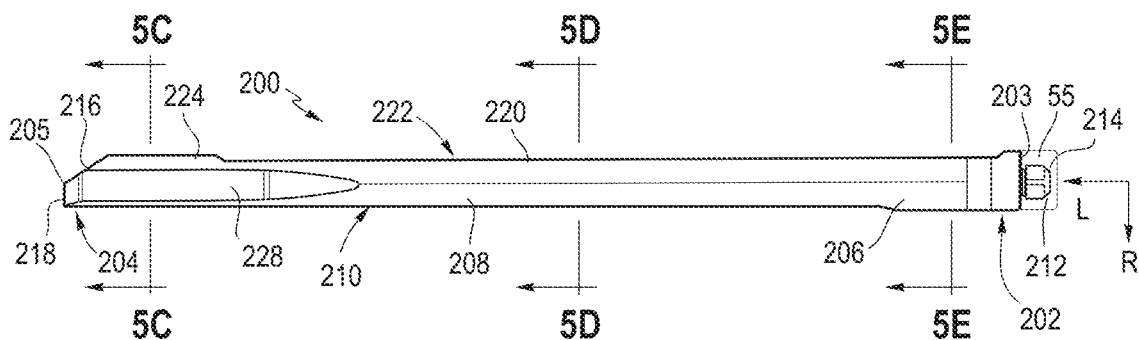
FIG. 5 is a side view of a pretensioner rod and a stopper according to the present disclosure.
Figure 5A:
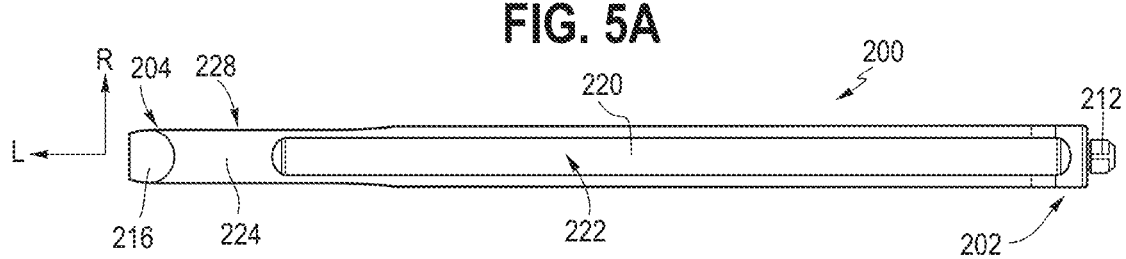
FIG. 5A is a top view of the pretensioner rod and the stopper of FIG. 5.
Figure 5B:
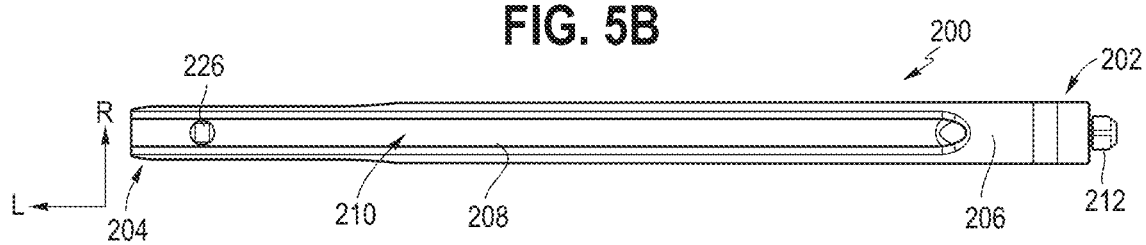
FIG. 5B is a bottom view of the pretensioner rod and the stopper of FIG. 5.

FIGS. 5, 5A, and 5B show the pretensioner rod 200, when disposed outside of the pretensioner tube 52, having a generally straight shape (prior to insertion into tube 52) and extending in a longitudinal direction L from a proximal end portion 202 to a distal end portion 204. The proximal end portion 202 is disposed towards the gas generator 36 when the pretensioner rod 200 is installed within the pretensioner system 44. According to an exemplary embodiment, the pretensioner rod 200 has a cross-section that varies along its length to define a non-recessed portion 206 and a recessed portion 208 that defines a recess 210 (a first recess). As shown in FIG. 5, the recessed portion 208 extends along a majority of the overall length of the pretensioner rod 200 from a location of the proximal end portion 202 to an end of the distal end portion 204. In an example, the recessed portion 208 extends to a distal-most end 205 of the distal end portion 204 of the pretensioner rod 200. In addition, the proximal end portion 202 includes the non-recessed portion 206 in which the recess 210 terminates at a distal-most location of the non-recessed portion 206. Further, as shown in FIG. 5B, the pretensioner rod 200 includes a protrusion 224 protruding radially from the first recess 210 in the distal end portion 204 to couple with the tube detent 50 of the pretensioner tube 52 when the pretensioner rod 200 is initially inserted into the tube 52 (i.e., before pretensioning).

The pretensioner rod 200 also includes a knob 212, extending proximally from the proximal end portion 202. The stopper 55 has a negative feature 214 formed therein that receives the knob 212 to couple the stopper 55 to the proximal end portion 202 of the pretensioner rod 200. According to a form of the present disclosure, the negative feature 214 and the knob 212 are sized such that the stopper 55 is compression fit, e.g., interference fit, onto the knob 212 to fixedly couple the stopper 55 to the pretensioner rod 200. Other forms of coupling and/or fixing the stopper 55 to the knob 212 and/or the proximal end portion 202 may be used, such as, for example, an adhesive, mechanical means, or the like.

Referring to FIGS. 5-5A and 5C-5E, the pretensioner rod 200 includes a recessed section 220 to further facilitate bending and preventing or minimizing twisting of the pretensioner rod 200 through the tube 52 during translation towards pretensioner wheel 56 during an actuation of the pretensioner. In particular, on a side opposite the first recess 210 of the pretensioner rod 200, the recessed section 220 defines a second recess 222 and that extends in the longitudinal direction L. The recessed section 220 extends along the majority of the overall length of the pretensioner rod 200. In a form of the present disclosure, as shown in FIGS. 5, 5A, 50, 5D and 5E, it has been found that by not extending the recess 222 through the distal end portion 204 has a relatively larger or fuller cross-sectional area for engaging the pretensioner wheel 56 during translation (i.e., a non-recessed section 224), thereby reducing the amount of the stripping of the pretensioner rod 200 which can occur at first contact with the pretensioner wheel 56, thereby increasing performance of the pretensioner system 44. In some embodiments, the non-recessed section 224 of the distal end portion 204 may have a length (ty, see FIG. 9A) of from about 15 mm to about 25 mm, such as about 20 mm, and the recessed section 220 of the rod 200 may have a length of from about 60 mm to about 145 mm.

Figure 5C:
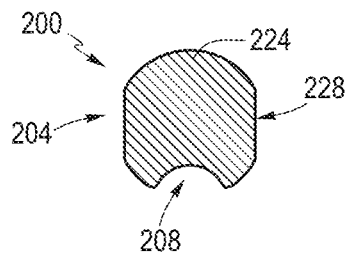
FIG. 5C is a cross-sectional view of the pretensioner rod, taken along line 5C-5C in FIG. 5.
Figure 5D:
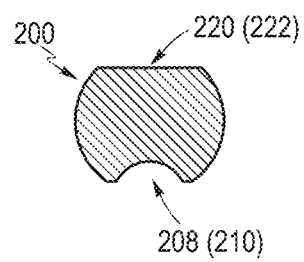
FIG. 5D is a cross-sectional view of the pretensioner rod, taken along line 5D-5D in FIG. 5.
Figure 5E:
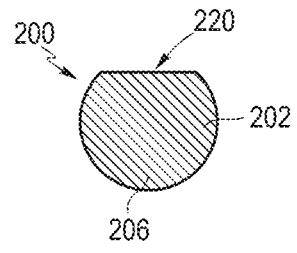
FIG. 5E is a cross-sectional view of the pretensioner rod, taken along line 5E-5E in FIG. 5.

FIGS. 5C-5E show cross-sectional views of the pretensioner rod 200 in three different locations along the length of the rod 200 of FIG. 5. FIG. 5C shows a cross-sectional view of the distal end portion 204 of the rod 200 having the non-recessed section 224 and the recessed portion 208 formed with the first recess 210. Further, the distal end portion 204 of the rod 200 has side surfaces 228, which are formed with a flat shape to reduce friction as the pretensioner rod 200 is being advanced through the pretensioner tube 52 during translation inside the tube 52. FIG. 5D shows a cross-sectional view of the middle portion of the pretensioner rod 200 having both the recessed portion 208 formed with the first recess 210 and the recessed section 220 formed with the second recess 222 to allow the pretensioner rod 200 to bend more easily across its radial thickness. The first recess 210 may be formed with a groove shape and the second recess 222 may be formed with a flat shape. FIG. 5E shows a cross-sectional view of the proximal end portion 202 of the rod having the non-recessed portion 206 and the recessed section 220.

Further, as shown in FIG. 5, it has been found that by not having the recesses/grooves 210 and 222 extend through a proximal-most end 203 of the rod 200, the proximal-most end 203 has a relatively larger or fuller cross-sectional area for the stopper 55 to contact to reduce the amount of initial compression on the pretensioner rod 200 during actuation of the gas generator 36, thereby increasing performance of the pretensioner system 44.

In FIGS. 5, 5A and 5B, the pretensioner rod 200 includes a chamfer 216 that is disposed on the non-recessed section 224 of the pretensioner rod 200 in the distal end portion 204. The chamfer 216 advantageously facilitates engagement of the pretensioner rod 200 with the pretensioner wheel 56 during pretensioning. Further, the chamfer 216 is formed as a straight or a curved shape such as a concave shape, and also defines a chamfered surface. However, other shapes of the chamfer 216 according to other exemplary embodiments may be implemented. In FIG. 5, for example, the straight shape of the chamfer 216 is configured to engage the pretensioner wheel 56 during pretensioning because the chamfer 216 on the pretensioner rod 200 is substantially parallel to the circumference of the pretensioner wheel 56 (See FIG. 7B). Due to the tapered shape of the rod 200, the chamfer 216 of the pretensioner rod 200 may keep a clearance with the pretensioner wheel 56 (i.e., a space between the chamfer 216 of the rod 200 and the circumference of the pretensioner wheel 56) before pretensioning.

As shown in FIGS. 5-5B, in some embodiments, the pretensioner rod 200 may further include another chamfer 218 (i.e., a second chamfer) at the distal end portion 204 of the rod 52 that may taper inwardly to form a chamfered shape in a length of the distal-most end 205 along the longitudinal direction L (not shown). The chamfer 218 is generally formed on the opposite side of the first chamfer 216 in a radial direction R of the pretensioner rod 200. In some embodiments, as shown in FIG. 5, the second chamfer 218 may be formed with a straight end surface (i.e., not tapered) in the distal-most end 205 of the rod 200. Accordingly, the flat surface of the second chamfer 218 may advantageously reduce the force required to advance the pretensioner rod 200 in the tube 52 to facilitate installation of the pretensioner rod 200 in the pretensioner system 44. According to other form of the present disclosure, however, the second chamfer 218 may be tapered along the longitudinal direction L like the first chamfer 216.

Further, the pretensioner rod 200 is preferably made from a polymer material, which has a reduced weight relative to metallic ball driving elements of the other roto-pretensioners. The particular polymer material can be selected to fit the particular desires of the user. The polymer material is preferably one that has sufficient flexibility such that it can bend and flex through the tube 52 to allow for initial installation as well as in response to actuation by the gas generator 36. The polymer material is preferably one that has sufficient stiffness to allow it to be pushed through the tube 52 in response to actuation, such that the rod 200 will sufficiently transfer a load to the pretensioner wheel 56 of the pretensioner system 44.

Further, the pretensioner rod 200 is preferably made from a polymer material that is deformable. During and after actuation, the rod 200 will be deformed in response to actuation and contact with other components of the pretensioner system 44. Accordingly, due to the vanes 102 of the pretensioner wheel 56, the pretensioner rod 200 is dented (elastically and plastically deformed) without any significant material separation (cutting) of the rod 200, so that the load exerted by the actuation gas pressure of the system 44 is fully transferred to the pretensioner wheel 56 through the deformation of the pretensioner rod 200. This deformation will be further discussed below with reference to the use of the system 44, where the plastic deformation will cause the system become locked to prevent or limit payback of the rod 200 without being completely dependent on maintained actuation gas pressure in the system. The plastic deformation also allows the rod 200 to deform and engage with the vanes of pretensioner wheel 56. In another approach, the pretensioner rod 200 is made from a nylon thermoplastic material. The rod 200 could also be made from an aliphatic polyamide thermoplastic material. In another approach, the rod 200 could be made from a similar thermoplastic material, such as an acetal material or polypropylene material.

Figure 6:
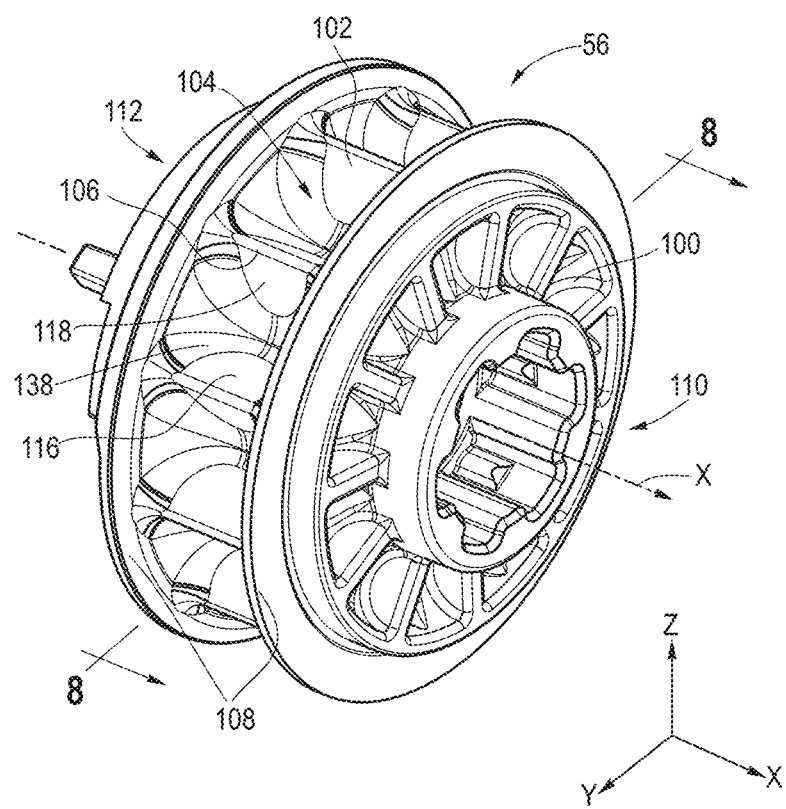
FIG. 6 is a perspective view of a pretensioner wheel with a plurality of vanes with the cavities according to the present disclosure.

Referring to FIG. 6, the pretensioner wheel 56 includes a body portion 100 with a general annular shape. The pretensioner wheel 56 is configured to rotationally couple with the spindle 40 for operatively connecting the pretensioner wheel 56 to the spindle 40 at one side 110, and configured to operatively engage with the spring end cap 42 at the other side 112. As shown in FIGS. 4 and 6, the pretensioner wheel 56 includes a plurality of vanes 102 that each project radially from the body portion 100, such that the vanes 102 extend from the center of the body portion 100. In addition, as shown in FIG. 6, the pretensioner wheel 56 further includes flanges 108 for guiding the pretensioner rod 200 when the rod 200 is engaged with the plurality of vanes 102 of the pretensioner wheel 56. The flanges 108 of the pretensioner wheel 56 radially extends further from the body portion 100 at both sides 110 and 112 compared to a radially outer tip 106 of the vanes 102. Accordingly, the vanes 102 are extended between the pair of flanges 108 along radials extending from a central axis X of rotation of the body portion 100. In addition, the flanges 108 prevent the engaged rod 200 on the vanes 102 of the pretensioner wheel 56 from being laterally disengaged.

In FIG. 6, each of the vanes 102 can have a uniform size and shape, and can be uniformly distributed around the pretensioner wheel 56. The vanes 102 each have a generally triangular shape on a cross-section plane of the pretensioner wheel 56 perpendicular to the central axis X with a root section 114 that tapers into the tip 106 as the vane 102 extends radially outward from the body portion 100 (see FIG. 8). The particular width and pitch of the vanes 102 can be selected as desired. The plurality of vanes 102 combine to form semi-spherical cavities 104 that are disposed between adjacent two of the plurality of vanes 102. Further, each cavity 104 formed between adjacent two of the plurality of vanes 102 has a pocket 138 preferably formed as a U-shape. However, the pocket shape of the cavity 104 may be changed according to another form of the present disclosure. In addition, a bottom section of the U-shape of the pocket 138 is formed as a semi-circle shape or a radius shape. Generally, the radius range of the radiused U-shape is between 3 mm and 7 mm, and preferably the radius of the U-shape is 5 mm.

Figure 7A:
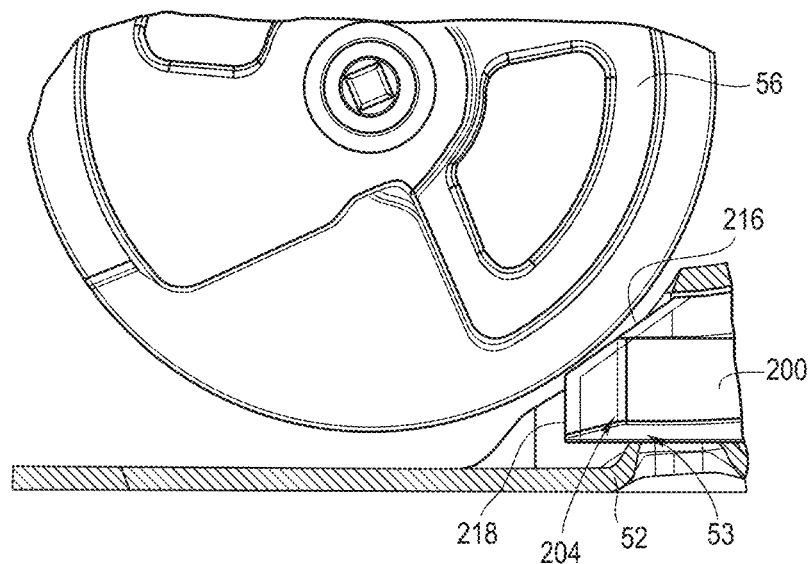
FIG. 7A is a plan view of the portion of a pretensioner wheel with a pretensioner rod arranged in an exit area of the pretensioner tube in a conventional pretensioner system.

FIG. 7A shows a conventional pretensioner system having the second tube end of the pretensioner tube with the pretensioner wheel, and 7B shows a detailed view of the second tube end 53 (i.e., the exit area) of the pretensioner tube 52 with the pretensioner wheel 56 according to the present disclosure. The polymer rod 200 is inserted into the tube 52 and the distal end portion 204 of the polymer rod 200 is located at the second tube end 53 of the pretensioner tube 52 before pretensioning (i.e., in a pre-actuation state of the gas generator). In the pretensioner system 44, the polymer rod 200 inserted into the tube 52 could change in dimension itself (i.e., the polymer rod extends itself along its longitudinal direction L) when the environment's temperature in which the pretensioner system is generally used goes up and down, such as from daytime high to night low, or between summer and winter. Accordingly, the polymer rod 200 inside the tube 52 has greater dimension changes than the tube 52 because the polymer material of the pretensioner rod 200 has higher linear coefficient of thermal expansion than the pretensioner tube 52 formed of a steel material. As shown in FIG. 7A of the conventional pretensioner system, the polymer rod could move in the direction of lower friction resistance after high-low temperature cycles, which is defined as a thermal creeping such that the polymer rod could move out of the tube (see the second tube end of the pretensioner tube in FIG. 7A). As shown in FIG. 7A, if the thermal creeping causes the polymer rod to move out of the tube (i.e., exiting the tube), the polymer rod could interfere with other components of the pretensioner system 44, such as the pretensioner wheel 56, which could be locked due to the interference of the polymer rod 200 in the pre-actuation state.

Figure 7B:
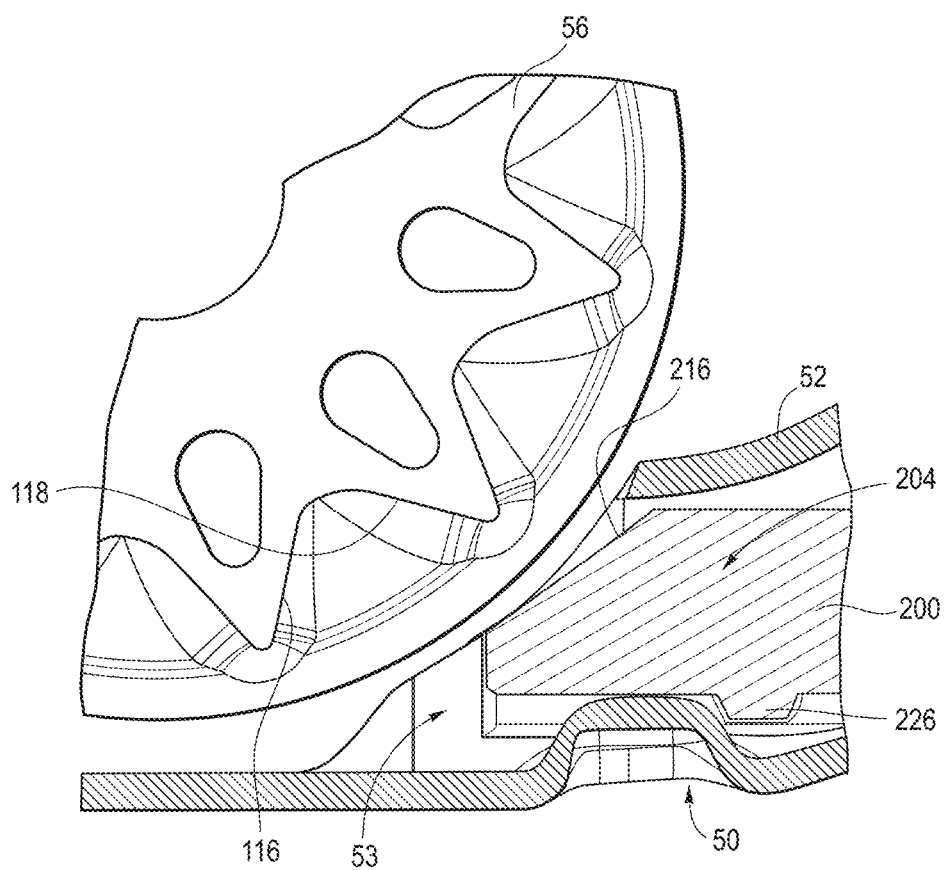
FIG. 7B is a cross-sectional view of a pretensioner wheel with a pretensioner rod arranged in an exit area of the pretensioner tube in a pre-actuation state according to the present disclosure.

FIG. 7B shows an exemplary embodiment of the present disclosure having the anti-creeping feature. As shown in FIG. 7B, the pretensioner tube 52 includes the tube detent 50 radially inward formed in the second tube end 53 of the tube 52 (i.e., exit area, see FIG. 4A) and the pretensioner rod 200 includes the protrusion 226 radially outward protruding from the first recess 210 of the recessed portion 208 (see FIG. 5B) in the distal end portion 204 of the rod 200. As shown in FIG. 7B, when thermal creeping of the polymer rod 200 occurs (i.e., the polymer rod's dimension is increased along the longitudinal direction of the rod), the polymer rod 200 moving out from the tube 52 could be restricted (or avoided) in the pre-actuation state because the protrusion 226 of the polymer rod 200 interferes with the tube detent 50 of the pretensioner tube 52. So, the protrusion 226 of the rod 200 coupled to the tube detent 50 of the tube 52 could limit how far the polymer rod 200 can travel due to the thermal creeping of the rod 200. Accordingly, as shown in FIG. 7B, the space defined between the circumferential edges of the pretensioner wheel 56 and the surface of the chamfer 216 formed in the distal end portion 204 of the polymer rod 200 is enough for the pretensioner wheel 56 to rotate freely without any interference with the rod 200.

Further, the anti-creeping feature such as the protrusion 226 of the polymer rod 200 and the tube detent 50 of the tube 52 can also be used as the pretensioner rod's 200 installation assistance to position the distal-most end 205 of the polymer rod 200 in more accurate location inside the pretensioner tube 52. In addition, the protrusion 226 of the polymer rod 200 is designed to be sheared or smeared off by the pretensioning force generated by the gas generator 36 in the pretensioner system 44 when the pretensioning starts (i.e., in the post-actuation state). Accordingly, in the post-actuation state, the pretensioner rod 200 freely moves out from the pretensioner tube 52 without interference between the protrusion 226 of the rod 200 and the pretensioner tube 52.

Figure 8:
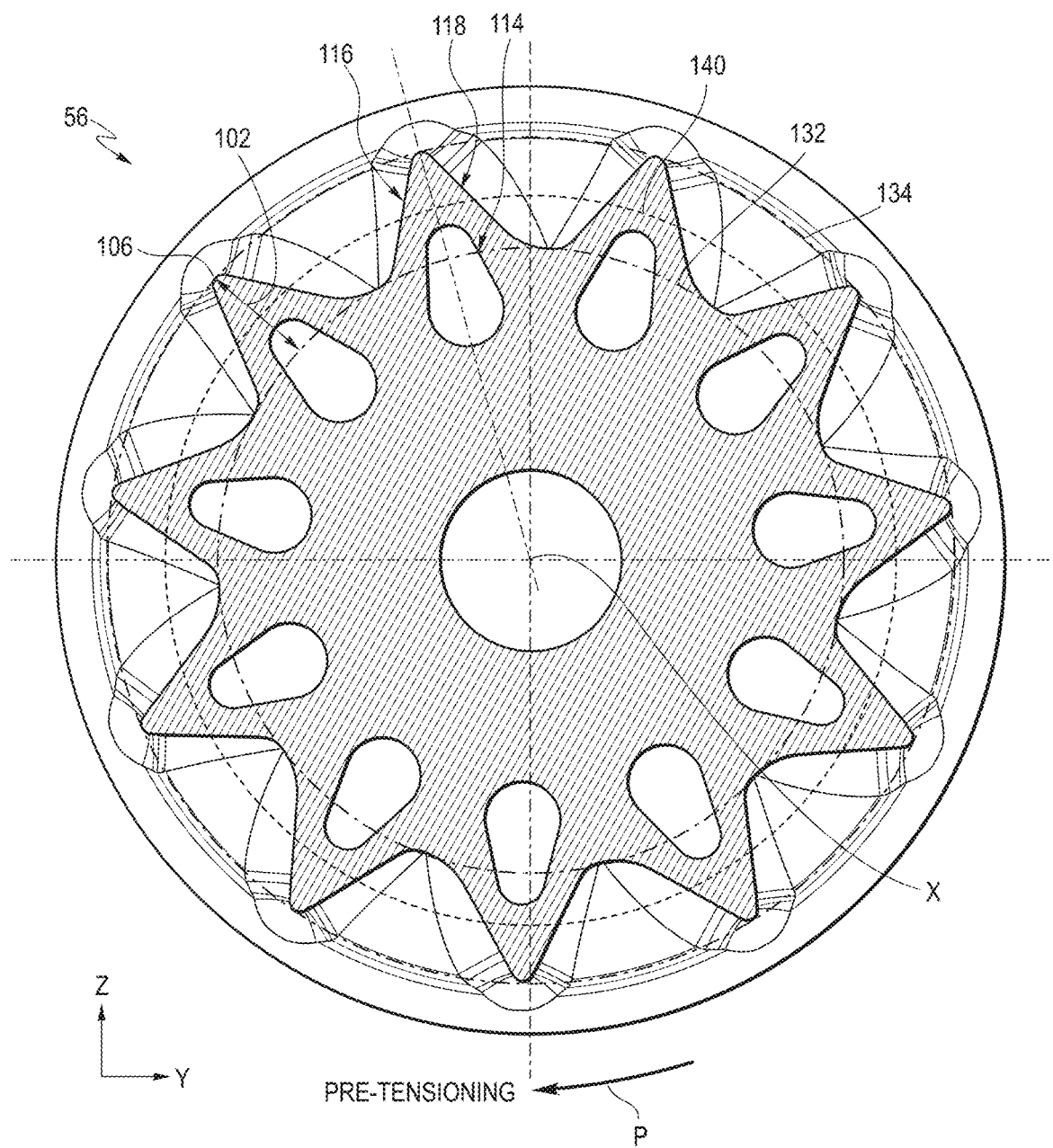
FIG. 8 is a cut-away view of the pretensioner wheel, taken along line 8-8 in FIG. 6.

Referring to FIG. 8, the pretensioner wheel 56 is formed with an odd number of vanes 102 between 5 and 13 vanes. For example, the pretensioner wheel 56 is preferably formed with 11 vanes. However, the number of the vanes 102 is adjusted according to the desired load and size of the pretensioner system 44. As shown in FIG. 8, when the pretensioner wheel 56 is formed with 11 vanes, the vanes 102 are evenly spaced around the circumference of the pretensioner wheel 56 with a spacing of approximately 32.73 degrees. Accordingly, the arrangement of the vanes 102 with the odd number is configured to avoid a pinch point as the pretensioner wheel 56 rotates and engages the pretensioner rod 200. That is, the vanes 102 with the odd number prevent the pretensioner wheel 56 from being locked due to the deformed pretensioner rod 200 when the pretensioner rod 200 is engaged with the pretensioner wheel 56 since with an odd number of vanes there are no diametrically opposed vanes which are both compressing the polymer rod. Further, each of the vanes 102 forms a first sidewall 116 and a second sidewall 118 to form a triangle shape in the cross-section plane as shown in FIG. 8.

Figure 8A:
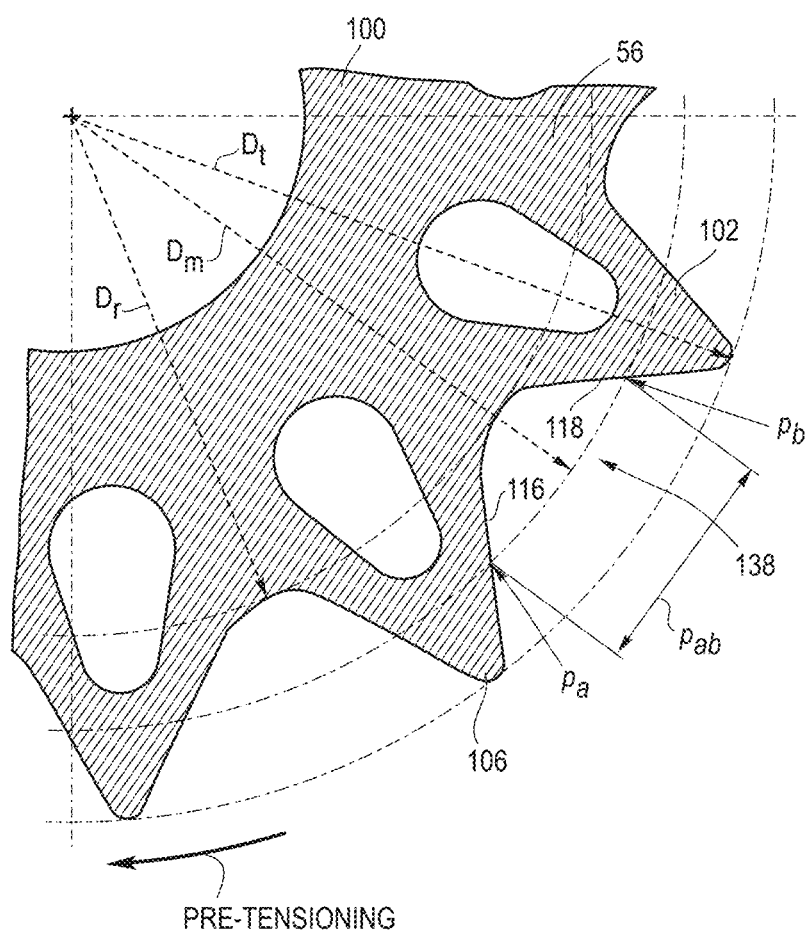
FIG. 8A is a detailed view of the pretensioner wheel of FIG. 8.

Further, FIG. 8A shows a detailed cross-sectional view of the pretensioner wheel 56. In FIGS. 8 and 8A, a root circle 132 of the pretensioner wheel 56 is defined by connecting each of the root sections 114 of the vane 102, and the diameter (root diameter, $D_r$) of the root circle 132 is, in an exemplary embodiment 28.35 mm. In addition, a tip circle 134 of the pretensioner wheel 56 is defined by connecting each tip 106 of the vanes 102, and the diameter (tip diameter, $D_t$) of the tip circle 134 is, in an exemplary embodiment 38.4 mm. Further, in FIG. 8, a middle circle 140 is defined to locate between the root circle 132 and the tip circle 134 such that the diameter (middle diameter, $D_m$) of the middle circle 140 is determined by an equation such as $D_m = D_r + \frac{1}{2}(D_t - D_r)$. However, the specific dimensions of the pretensioner wheel 56 described above are modified according to other forms of the present disclosure.

As shown in FIG. 8A, on the first and second sidewalls 116 and 118 of the vane 102, a first point $P_a$ and a second point $P_b$ are each defined to locate where the middle circle 140 and each surface of the first and second sidewalls 116 and 118 intersect. The first point $P_a$ is located on the surface of the first sidewall 116 at the intersection location with the middle circle 140 and the second point $P_b$ is located on the surface of the second sidewall 118 at the intersection location with the middle circle 140. Further, as shown in FIG. 8A, a vane distance $P_{ab}$ is defined between the first point $P_a$ and the second point $P_b$ in the pocket 138 of each vane 112.

Figure 8B:
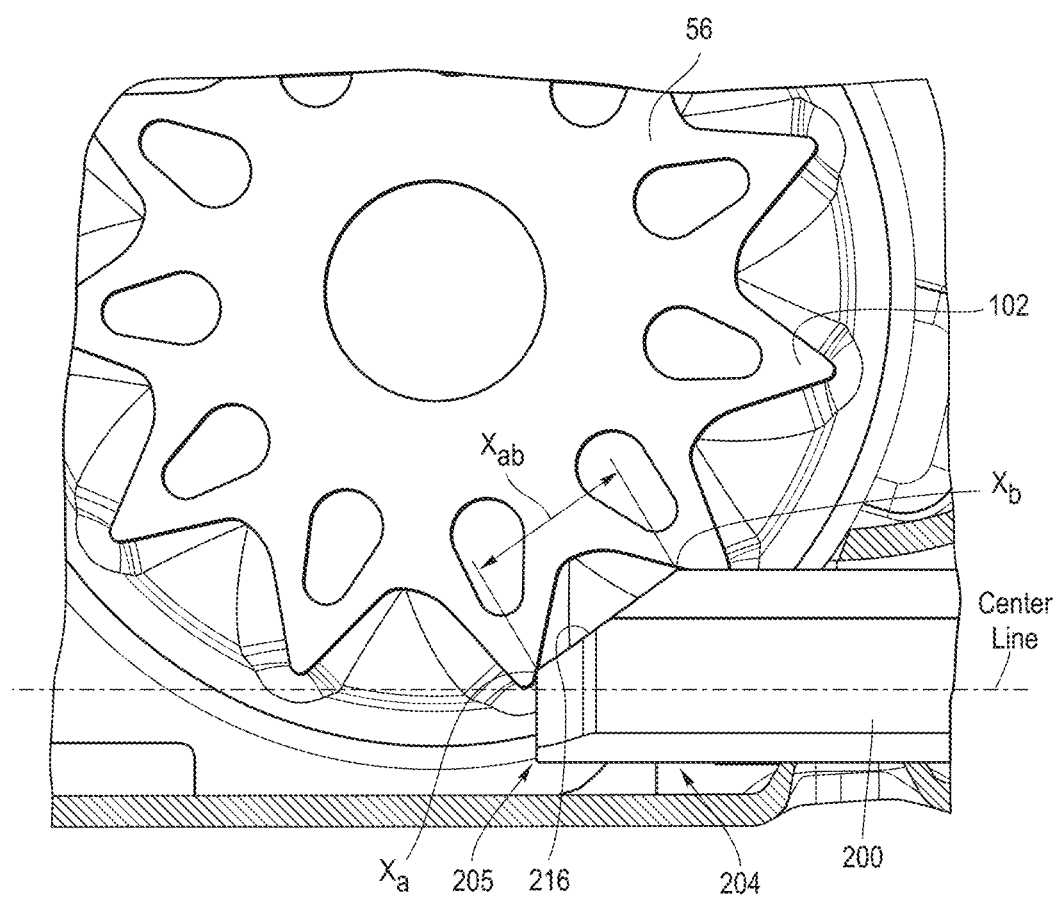
FIG. 8B is a cross-sectional view of the pretensioner wheel with the pretensioner rod in post-actuation state according to the present disclosure.

Further, FIG. 8B shows a detailed cross-sectional view of the pretensioner rod 200 exiting the pretensioner tube 52 to engage the pretensioner wheel 56 during pretensioning. As shown in FIG. 5, the pretensioner rod 200 has the first chamfer 216 that is tapered with a flat shape in the distal end portion 204 of the pretensioner rod 200 to engage with the pretensioner wheel 56 during the pretensioning. As shown in FIG. 8B, the chamfer 216 of the pretensioner rod 200 has a starting point $X_a$ located slightly above the center line of the rod 200 along the longitudinal direction L and an ending point $X_b$ located on the circumferential line of the rod 200 such that the chamfer 216 of the rod 200 is tapered with the flat surface. Further, a chamfer length $X_{ab}$ is defined as a distance between the starting and ending points $X_a$ and $X_b$, which may be a straight line or a curved line in the side cross-sectional view of the rod 200. In addition, as shown in FIGS. 8A and 8B, the chamfer length $X_{ab}$ of the chamfer 216 is greater than the vane distance $P_{ab}$ of the vane 102 to avoid the pretensioner rod's stripping and reduce energy consumption during the pretensioning.

Figure 9A:
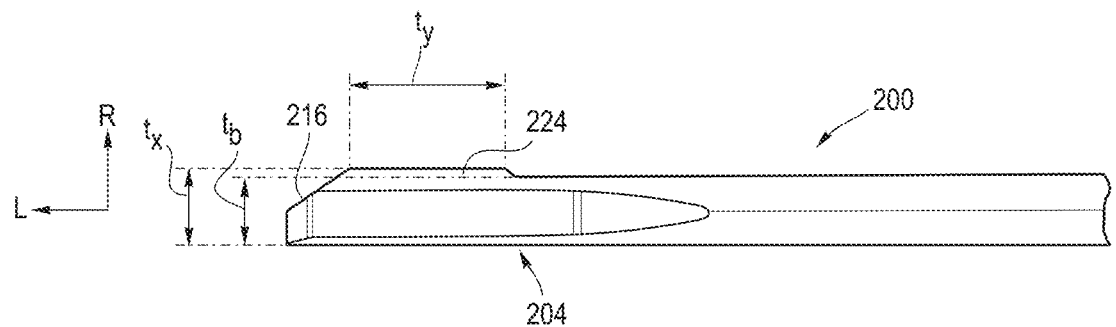
FIG. 9A is a detailed side view of the pretensioner rod of FIG. 5.
Figure 9B:
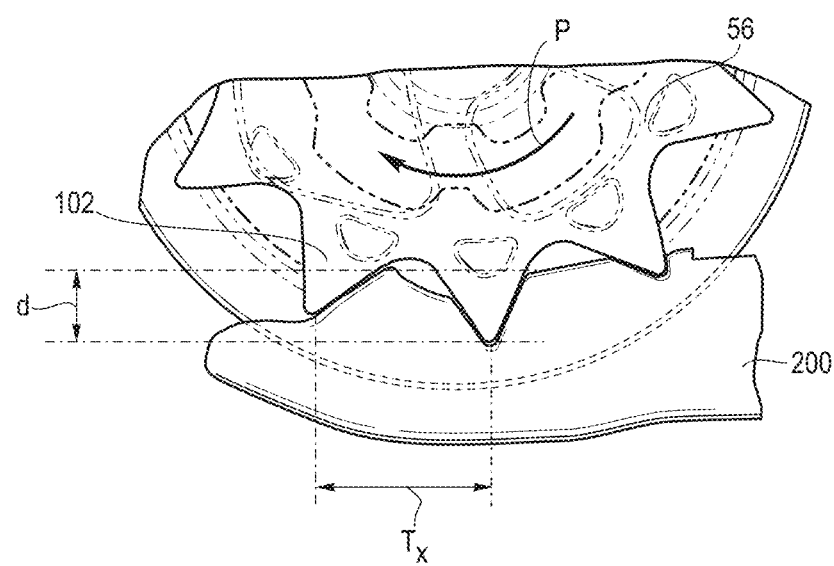
FIG. 9B is a side cut-away view of the pretensioner rod and the pretensioner wheel when the pretensioner rod engages a couple of vanes of the pretensioner wheel during pretensioning.

FIG. 9A shows a detailed view of a distal end portion 204 of the pretensioner rod 200 of FIG. 5, and FIG. 9B shows a detailed view of the pretensioner rod 200 engaged with the pretensioner wheel 56. Referring back to FIG. 7B, the distal end portion 204 of the pretensioner rod 200 is located at the exit of the pretensioner tube 52 and the surface of the chamfer 216 is arranged substantially parallel to the circumference of the annular body portion 100 of the pretensioner wheel 56. During pretensioning, when the pretensioner rod 200 exits toward the pretensioner wheel 56 from the tube 52, the rod 200 moves along the pretensioning direction P and engages the vanes 102 of the pretensioner wheel 56. Accordingly, when the pretensioner rod 200 fully comes out from the tube 52 and is coupled with the pretensioner wheel 56, the pretensioner rod 200 is engaged around the vanes 102 of the pretensioner wheel 56 such that the pretensioner system 44 is pretensioned.

As shown in FIGS. 9A and 9B, when the pretensioner rod 200 is engaged with the pretensioner wheel 56, the pretensioner rod 200 is deformed according to the engaged vanes 102 and cavities 104. In order to have the pretensioner rod 200 engage the pretensioner wheel 56 and transfer the pretensioning force or torque, in general, the pretensioner wheel 56 is made with a material that has higher hardness than the material of the pretensioner rod 200 such as glass fiber reinforced plastics or metals. So, as shown in FIG. 9B, the pretensioner rod 200 is deformed or dented along the vanes 102 and deformed to fill into the cavities 104.

In FIGS. 9A and 9B, the pretensioner rod 200 has the non-recessed section 224, which is thicker than the main body portion of the rod 200 (i.e., the recessed section 220) due to the recess 222. In the side view of the pretensioner rod 200 (see FIGS. 5 and 9A) along the longitudinal axis L, the radial thickness $t_x$ of the non-recessed section 224 is greater than the thickness $t_b$ of the recessed section 220. Further, the length ty of the non-recessed section 224 of the rod 200 is greater than the distance of two adjacent wheel teeth tips $T_x$ such that the rod 200 is effectively engaged with the vanes 102 of the pretensioner wheel 56 during the pretensioning. Due to the thicker thickness of the distal end portion 204 of the rod 200, the pretensioner rod 200 keeps the engagement with the pretensioner wheel 56 without the rod's stripping and/or cutting and also reduces energy consumption when the pretensioner rod 200 is deformed during the pretensioning. Accordingly, the load exerted by the gas pressure may be fully transferred to the pretensioner wheel 56 because the pretensioner rod 200 could be engaged with the pretensioner wheel 56 without any stripping or cutting of the rod's material.

Further, due to the vanes 102 of the pretensioner wheel 56, as shown in FIG. 9B, the deformed shape of the rod 200 is similar to the shape of the vane 102. Accordingly, the overlap portion between the rod 200 and the vane 102 (i.e., a deformed depth d of the rod 200) is approximately between 15% and 50% of the radial thickness of the rod 200 in the radial direction of the pretensioner wheel 56. Accordingly, the deformed depth d is not greater than a half of the radial thickness of the pretensioner rod 200. As shown in FIG. 9B, when the pretensioner rod 200 is engaged with the pretensioner wheel 56 during pretensioning, the pretensioner rod 200 keeps the engagement with the pretensioner wheel 56 without any separation (cutting or stripping) of the material of the pretensioner rod 200.

Referring back to FIGS. 4 and 4A, as described above, the retractor assembly 32 includes the gas generator 36 that provides expanding gas in response to a firing signal. The expanding gas causes an increase in pressure within the tube 52, which ultimately causes the rod 200 to be forced away from the gas generator 36 and through the tube 52. In FIG. 4, the pretensioner tube 52 includes a piston or a seal 72. The seal 72 can have a cylindrical shape with a cylindrical outer surface as best shown in FIG. 4. However, other suitable shapes of the piston or seal 72 in accordance with other form of the present disclosure may be implemented. Activation of the gas generator 36 enables the seal 72 to resist gas leakage. Pressurized gas within a gas chamber 74 causes the seal 72 to expand, which helps prevent gas from escaping past the seal 72. Accordingly, the seal 72 of the present disclosure is operable to retain a high seal pressure as well as maintain residual gas pressure within the tube 52.

For example, the seal 72 is formed as a spherical shape. The seal 72 is slidably disposed within tube 52 and is operable to drive the pretensioner rod 200 along an actuating path along the tube 52. As will be understood by those of skill in the art, the seal 72 may be press-fitted or otherwise fitted inside the tube 52. In addition, the seal 72 defines a generally elastic structure, and may be composed of various materials known in the art, such as any suitable plastic or polymer (e.g., polyester, rubber, thermoplastic, or other elastic or deformable material). Moreover, the seal 72 may be die cast, forged, or molded from metal, plastic or other suitable material. According to further aspect of the present disclosure, the seal 72 may be formed using a two-cavity or two shot (2K) injection molding process. The generally elastic structure allows the shape of the seal 72 to change slightly in response to pressure, thereby improving the sealing that it provides.

While the above description constitutes the preferred embodiments of the present invention, it will be appreciated that the invention is susceptible to modification, variation and change without departing from the proper scope and fair meaning of the accompanying claims.

What is claimed is:

1. A seatbelt pretensioner system for use in a seatbelt pretensioning retractor assembly, the seatbelt pretensioner system comprising:
   a pretensioner tube in fluid communication with a gas generator; and
   a pretensioner rod having a proximal end portion disposed towards the gas generator and a distal end portion disposed at an exit area of the pretensioner tube, the pretensioner rod disposed inside the pretensioner tube defined as a pre-actuation state and adapted to travel within the pretensioner tube toward a pretensioner wheel upon an actuation of the gas generator defined as a post-actuation state,
   wherein the pretensioner rod includes a protrusion formed radially in a distal end portion of the rod to couple with the pretensioner tube to restrict the rod from moving out from the pretensioner tube in the pre-actuation state,
   wherein the pretensioner tube includes a tube detent formed radially inward in the exit area of the tube to engage with the protrusion formed in the distal end portion of the pretensioner rod, and
   wherein the protrusion of the pretensioner rod is designed to be sheared or smeared off by pretensioning force generated by the gas generator when the pretensioning starts such that in the post-actuation state, the pretensioner rod moves freely out from the pretensioner tube.

2. The seatbelt pretensioner system of claim 1, wherein, in the pre-actuation state, the interaction between the protrusion and the tube detent limits movement of the pretensioner rod toward the pretensioner wheel when a thermal creeping of the rod occurs.

3. The seatbelt pretensioner system of claim 1, wherein due to a tube detent of the pretensioner tube, the protrusion of the pretensioner rod engages with the tube detent such that a distal-most end of the rod is substantially aligned with a second tube end of the pretensioner tube in the pre-actuation state.

4. The seatbelt pretensioner system of claim 1, wherein the protrusion of the pretensioner rod protrudes radially from a recessed portion of the pretensioner rod.

5. The seatbelt pretensioner system of claim 1, wherein the pretensioner rod is in the form of a flexible elongated rod formed of a polymer material.

6. A seatbelt pretensioner system for use in a seatbelt pretensioning retractor assembly having a housing and a spindle, the seatbelt pretensioner system comprising:
   a pretensioner tube in fluid communication with a gas generator;
   a pretensioner rod having a proximal end portion disposed towards the gas generator and a distal end portion disposed at an exit of the pretensioner tube inside the pretensioner tube, the pretensioner rod having a chamfer formed in a distal end portion of the pretensioner rod; and
   a pretensioner wheel rotatably mounted to the housing and fixedly coupled to the spindle, the pretensioner wheel including a body portion having an annular shape and a plurality of vanes formed around a circumference of the body portion, the plurality of vanes each having a first sidewall and a second sidewall,
   wherein in a cross-sectional plane of the pretensioner wheel perpendicular to a rotational axis of the pretensioner wheel, the pretensioner wheel has a root circle defined by connecting each of root sections of the vanes and a tip circle defined by connecting each of tip points of the vanes,
   wherein a first point is defined on a surface of the first sidewall when a circle line defined between the tip circle and the root circle intersects with the first sidewall and a second point is defined on a surface of the second sidewall when the circle line intersects with the second sidewall such that a vane distance is defined between the first point and the second point in a pocket formed between the two vanes, and
   wherein the chamfer of the pretensioner rod has a chamfer length greater than the vane distance in the pocket.

7. The seatbelt pretensioner system of claim 6, wherein in a cross-sectional side view of the rod along the longitudinal axis, the chamfer is tapered, and has a starting point above a center line of the rod along the longitudinal axis on a distal-most end of the rod and an ending point on a circumferential edge of the rod such that the chamfer length is defined as a distance from the starting point to the ending point.

8. The seatbelt pretensioner system of claim 6, wherein the chamfer of the rod is formed with a flat shape or a curved shape.

9. The seatbelt pretensioner system of claim 6, wherein the circle line is defined as a middle circle located between the tip circle and the root circle.

10. The seatbelt pretensioner system of claim 6, wherein the pretensioner rod is configured to avoid a stripping of the rod and reduce energy consumption when the rod is deformed during pretensioning.

11. The seatbelt pretensioner system of claim 6, wherein a first radial thickness defined in a non-recessed section of the rod is greater than a second radial thickness defined in a recessed section of the rod in a cross-sectional side view of the rod along the longitudinal axis.

12. The seatbelt pretensioner system of claim 6, wherein a length of a non-recessed section along the longitudinal axis of the rod is greater than a tip distance between two adjacent vane tips of the pretensioner wheel.

13. The seatbelt pretensioner system of claim 6, wherein a deformed depth of the pretensioner rod is between 15% and 50% of a radial thickness of the rod when the pretensioner rod is engaged with the vanes of the pretensioner wheel during pretensioning.

\* \* \* \* \*